UNITED STATES PATENT OFFICE.

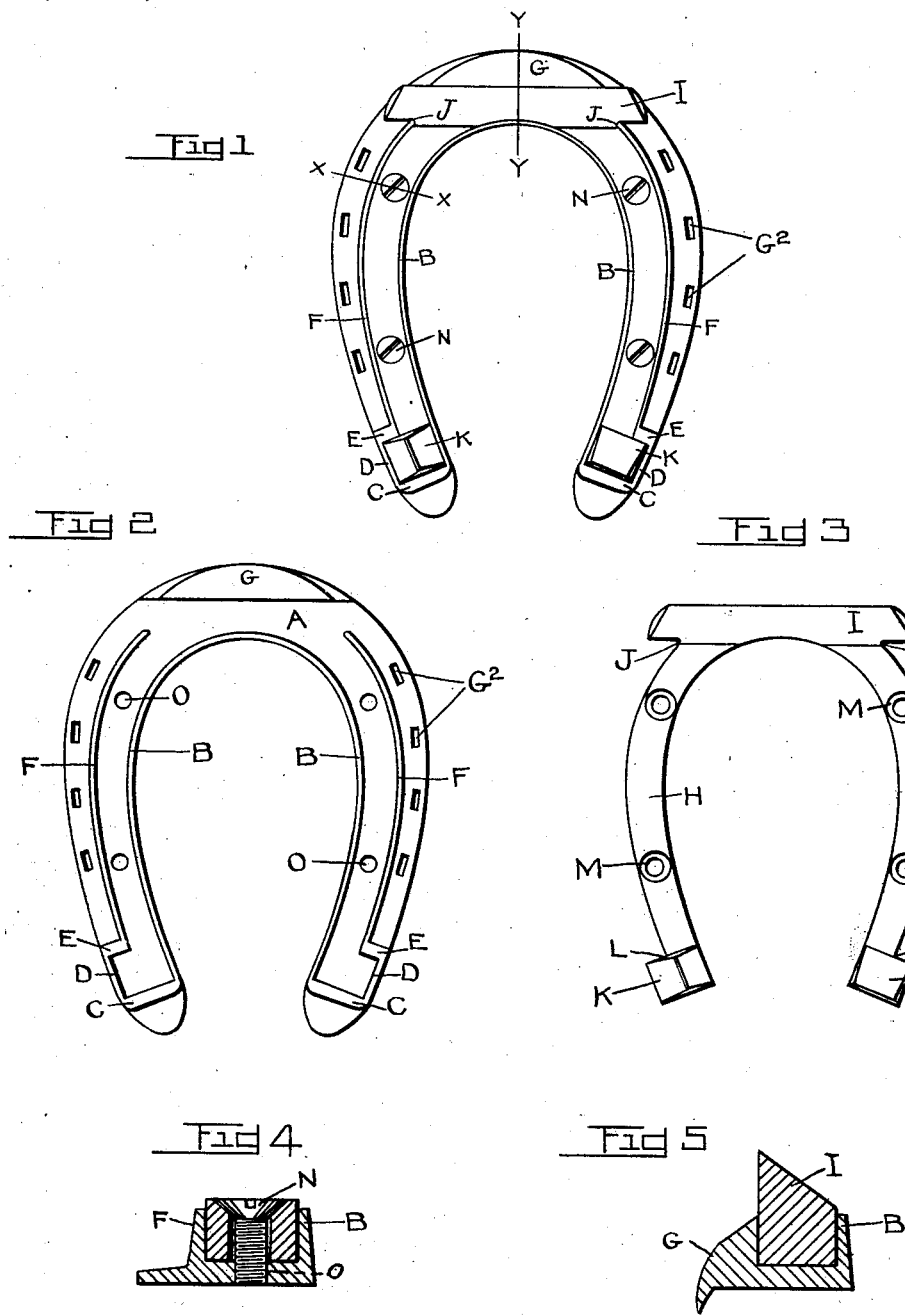

CHRISTIAN STRUBE, OF TRENTON, NEW JERSEY.

HORSESHOE.

SPECIFICATION forming part of Letters Patent No. 700,159, dated May 13, 1902.

Application filed March 4, 1902. Serial No. 96,600. (No model.)

*To all whom it may concern:*

Be it known that I, CHRISTIAN STRUBE, a citizen of the United States, residing at Trenton, in the county of Mercer and State of New Jersey, have invented certain new and useful Improvements in Horseshoes, of which the following is a specification, reference being had therein to the accompanying drawings.

This invention relates to horseshoes, and more definitely to that class of horseshoes which are sometimes described as "duplex," the same being composed of two parts or pieces—viz., a hoof-plate and a wear-plate—the former of which is attached to the hoof of the animal by means of nails in the usual manner, while the latter is connected with the hoof-plate by means of screws in such a manner that it may be readily detached for the purpose of renewing or for the convenient sharpening of the calks which form a part thereof.

The object of my invention is to provide a horseshoe of this class the construction of which shall be simple and inexpensive, which shall admit of the ready detaching or replacing of the wear-plate, and in which the latter when in position shall be held so securely against jarring as to relieve the connecting-screws from wear and strain.

With these and other ends in view the invention consists in the improved construction, arrangement, and combination of parts, which will be hereinafter fully described, and particularly pointed out in the claims.

In the drawings hereto annexed, Figure 1 is a bottom plan view of a horseshoe embodying my improvements. Fig. 2 is a bottom plan view of the upper part or hoof-plate. Fig. 3 is a bottom plan view of the lower part or wear-plate detached from the hoof-plate. Fig. 4 is a sectional view taken on the line $x$ $x$ in Fig. 1. Fig. 5 is a sectional view taken on the line $y$ $y$ in Fig. 1.

Corresponding parts in the several figures are indicated by like letters of reference.

A designates the hoof-plate, which is of the conventional shape and outline of a horseshoe and which is to be fitted in the usual manner to the hoof of the animal. The hoof-plate is provided with a downwardly-extending rib or flange, which may be described as extending entirely along the inner edge of said hoof-plate, as at B, along the heel ends of the same, as at C C, along the outer edges for short distances from the heels, as at D D, thence inwardly for short distances to form shoulders or offsets, as E E, and finally in a forward direction intermediately between the inner and the outer edges of the flanks of the hoof-plate, as at F F. The ends F F of the rib or flange terminate at short distances from the toe end of the hoof-plate at points in a line with that part B of the rib or flange which is at the extreme toe end of the inner edge of the hoof-plate, as will be clearly seen by reference to Fig. 2 of the drawings. At the extreme toe end of the hoof-plate is formed a downward-depending lug G, the contour of the front edge of which conforms to that of the hoof-plate, while its rear edge is straight, so as to form a bearing for the toe end of the wear-plate, as will presently appear. The outer edges of the hoof-plate—*i. e.*, those parts of said hoof-plate which lie outside the parts F F of the depending rib or flange—are provided with nail-holes $G^2$ $G^3$ for the passage of the nails by means of which the hoof-plate is in practice to be secured to the hoof of the animal in the fashion in which horseshoes are ordinarily attached.

H designates the wear-plate, also sometimes called the "shoe-plate," which is of the general contour or outline of a horseshoe and which is made of such size and shape as to cause the flanks thereof to fit accurately between the parts B and F F of the downward-depending rib or flange of the hoof-plate. At the front end of the wear-plate and integral therewith is formed the toe-calk I, the ends of which extend transversely beyond the flanks of the wear-plate, between which and the ends of said toe-calk are thus formed the recesses J J, which receive the extreme front ends of the parts F F of the rib or flange depending from the hoof-plate. The toe-calk is, moreover, made of such dimensions that its front edge shall fit closely against the rear edge of the lug G of the hoof-plate. The wear-plate is also provided at the rear ends of its flanks with the heel-calks K K, the outer edges of which are extended beyond the outer edges of the flanks of the wear-plate, so as to form the shoulders or offsets L L, which are adapted to abut against the shoulders formed by the parts E E of the rib depending from the hoof-plate, as has been hereinbefore described. The wear-plate is provided with suitably-located holes or perforations M M for the passage of the connecting-screws N N, for the reception of the points of which screw-threaded openings O O are also provided in the hoof-plate.

In operation that part of my improved horseshoe which I have described as the "hoof-plate," is secured by means of nails to the hoof of the animal, to which it remains attached with some degree of permanency. The wear-plate is then placed in the seat formed for its reception by the rib or flange, (denoted by the letters B, C, D, E, and F,) in conjunction with the lug G of the hoof-plate, and secured in position by means of the screws N N. By simply removing the latter the wear-plate may at any time be readily detached for the purpose of sharpening the calks, an operation which may be readily performed by an unskilled person with no other tools than an ordinary file.

In the practical construction of my improved horseshoe it is intended that the parts C C at the heel ends and the parts E E, which form the shoulders or offsets of the rib or flange depending from the hoof-plate, shall be reinforced or somewhat thicker than the remaining portions of the said rib or flange, as will be plainly seen in Figs. 1 and 2 of the drawings. The purpose of this feature of my invention will be readily apparent when it is considered that it is these parts of the rib or flange which are in direct contact with the rear ends of the heel-calks and with the shoulders L L at the forward outer corners of these and which are thus subject to the greatest lateral strain in both a rearward and a forward direction at each step taken by the horse. In like manner the toe-calk of the wear-plate engages the lug G and the extreme front ends of the parts F F of the rib or flange, which latter engage the recesses J J between the projecting ends of the toe-calk and the flanks of the wear-plate, and by these means a lateral movement of the latter in either a forward or rearward direction, in which the strain and consequent tendency to such movement is greatest, is effectively prevented. The flanks of the wear-plate being confined between and prevented from movement in a sidewise direction by the parts B F F of the rib or flange, it will be seen that the said wear-plate is held with such security as to practically relieve the connecting-screws from wear and strain.

By forming the seat for the wear-plate of my improved horseshoe of a single continuous web, forming the rib or flange hereinbefore described as composed of the parts or sections B C C D D E E F F, which said parts or sections shall be distinctly understood as forming a single continuous web or flange, integral with the base of the hoof-plate the latter may be made comparatively thin and light without detracting from the necessary elements of strength and rigidity. It will also be observed that the nail-holes are so located as to be easily and conveniently accessible to the farrier whether the wear-plate be in position in its seat or detached.

Having thus described my invention, I claim and desire to secure by Letters Patent of the United States—

1. In a duplex horseshoe, the hoof-plate having a downward-extending rib or flange formed by a single continuous web extending entirely along the inner edge of said hoof-plate, along the heel ends, thence forwardly along the outer edges, thence inwardly to form shoulders or offsets, and thence forwardly, intermediately between the inner and outer edges of the flanks of said hoof-plate, substantially as set forth.

2. The hoof-plate having a downward-extending rib or flange formed by a single continuous web extending entirely along the inner edge of said hoof-plate, along the heel ends, thence forwardly along the outer edges, thence inwardly to form shoulders or offsets, and thence forwardly, intermediately between the inner and outer edges of the flanks of said hoof-plate to terminal points which are in a line with that part of the said rib or flange which is located at the extreme toe end of the inner edge of the said hoof-plate, substantially as set forth.

3. The hoof-plate having the downward-extending rib or flange formed by a single continuous web extending entirely along the inner edge and heel ends of said hoof-plate, thence forwardly along the outer edges, thence inwardly to form shoulders or offsets, and thence forwardly, those parts of said rib or flange which are located at the heel ends, and which form the shoulders or offsets being thickened or reinforced, substantially as and for the purpose set forth.

4. The hoof-plate having the downward-extending rib or flange formed by a single continuous web extending entirely along the inner edge and heel ends of said hoof-plate, thence forwardly along the outer edges, thence inwardly to form shoulders or offsets, and thence forwardly, in combination with the wear-plate fitted to the seat formed by said rib or flange and provided with heel-calks extended beyond the outer edges of the flanks of the wear-plate to form shoulders abutting against the shoulders or offsets of the rib or flange depending from the hoof-plate, substantially as set forth.

5. The hoof-plate having the downward-extending rib or flange formed by a single continuous web extending entirely along the inner edge and heel ends of said hoof-plate, thence forwardly along the outer edges, thence inwardly to form shoulders or offsets, and thence forwardly to points on a line with that part of the said rib or flange which is located at the extreme toe end of the inner edge of said hoof-plate, the latter being also provided at its extreme toe end with a downward-extending lug, in combination with the wear-plate having heel-calks extending beyond the outer edges of its flanks, and a toe-calk the ends of which extend beyond the flanks of said wear-plate, substantially as and for the purpose set forth.

In testimony whereof I affix my signature in presence of two witnesses.

CHRISTIAN STRUBE.

Witnesses:
MICHAEL J. SOLAN,
WILLIAM W. HOWELL.